(12) United States Patent
Esgandari

(10) Patent No.: US 9,689,448 B2
(45) Date of Patent: Jun. 27, 2017

(54) BRAKE PAD AND METHOD OF FORMING SUCH

(71) Applicant: Jaguar Land Rover Limited, Whitley, Coventry, Warwickshire (GB)

(72) Inventor: Mohammad Esgandari, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/433,646

(22) PCT Filed: Oct. 15, 2013

(86) PCT No.: PCT/EP2013/071549
§ 371 (c)(1),
(2) Date: Apr. 4, 2015

(87) PCT Pub. No.: WO2014/060430
PCT Pub. Date: Apr. 24, 2014

(65) Prior Publication Data
US 2015/0275995 A1      Oct. 1, 2015

(30) Foreign Application Priority Data

Oct. 15, 2012   (GB) .................................... 1218472.7
Feb. 21, 2013   (GB) .................................... 1303043.2

(51) Int. Cl.
*F16D 69/02*      (2006.01)
*F16D 65/092*     (2006.01)
*F16D 69/00*      (2006.01)

(52) U.S. Cl.
CPC ........... *F16D 69/02* (2013.01); *F16D 65/092* (2013.01); *F16D 69/00* (2013.01);
(Continued)

(58) Field of Classification Search
CPC ........ F16D 65/04; F16D 65/092; F16D 69/00; F16D 69/02; F16D 2069/002; F16D 2069/005
See application file for complete search history.

(56) References Cited

U.S. PATENT DOCUMENTS 2,135,126 A * 11/1938 Harwood ................ F16D 13/64
192/107 C
4,926,978 A    5/1990 Shibata et al.
(Continued)

FOREIGN PATENT DOCUMENTS

CN    1424211 A    6/2003
DE    4140220   *  6/1993
(Continued)

OTHER PUBLICATIONS

GB Combined Search and Examination Report for corresponding application No. 1303043.2, dated Jul. 29, 2013, 5 pages.
(Continued)

*Primary Examiner* — Vishal Sahni
(74) *Attorney, Agent, or Firm* — Reising Ethington P.C.

(57) ABSTRACT

A brake pad for a brake system, the brake pad comprising: a first brake pad surface having a coefficient of friction, the brake pad being for contact, in use, with a first radial portion of a component having a rotation axis, wherein: at a first point on the first brake pad surface the coefficient of friction has a first value;
at a second point on the first brake pad surface the coefficient of friction has a second value greater than the first value; and
at a third point on the first brake pad surface the coefficient of friction has a third value greater than the second value, wherein, in use, the first, second and third points are configured to be contactable with corresponding points on the first radial portion of the component at locations of
(Continued)

increasing radial distance from the rotation axis so that the second point is further from the rotation axis than the first point, and the third point is further from the rotation axis than the second point.

24 Claims, 4 Drawing Sheets

(52) U.S. Cl.
CPC .. *F16D 2069/002* (2013.01); *F16D 2069/005* (2013.01); *Y10T 29/49826* (2015.01)

(56) References Cited

U.S. PATENT DOCUMENTS

| 1,918,127 | A | 7/1993 | Pfeiffer |
| 6,672,433 | B2 | 1/2004 | Yamaguchi et al. |

FOREIGN PATENT DOCUMENTS

| DE | 4140220 | A1 | | 6/1993 |
| JP | S61184232 | A | | 8/1986 |
| JP | S63152734 | A | | 6/1988 |
| JP | H03152124 | A | | 6/1991 |
| JP | 9-112606 | A | * | 5/1997 |
| JP | H10274264 | A | | 10/1998 |
| JP | 2000205316 | A | | 7/2000 |
| JP | 2005299841 | A | | 10/2005 |
| WO | 0227207 | A1 | | 4/2002 |
| WO | 03058089 | A1 | | 7/2003 |

OTHER PUBLICATIONS

International Search Report for application No. PCT/EP2013/071549, dated Feb. 3, 2014, 4 pages.
Written Opinion for application No. PCT/EP2013/071549, dated Feb. 3, 2014, 6 pages.
Chinese Office Action, in Chinese with English summary, corresponding to CN application No. 201380053955.7, dated Jun. 3, 2016, 17 pages.

* cited by examiner

BRAKE PAD AND METHOD OF FORMING SUCH

TECHNICAL FIELD

The present invention relates to a brake pad for use in a brake system, and a method of forming a brake pad. In particular, the present invention relates to a brake pad for use in a brake system of a motor vehicle.

BACKGROUND

Brake pads are known to be used in brake systems. For example, brake pads are used to contact brake discs, or other moving components, to decrease or prevent the motion of a motor vehicle. This is usually performed by using a calliper apparatus to press the brake pad onto the moving component. Conventionally, brake pads have a surface area which engages a surface of the moving component. A coefficient of friction across the brake pad determines the frictional force that the brake pad can supply to stop the motion of the component. It is desirable to have a high coefficient of friction of the brake disc to provide good braking power. Therefore, brake pads generally have a constant coefficient of friction across the surface.

Brake pads such as those mentioned above provide adequate stopping ability but are susceptible to instabilities on contact with the moving component. The instabilities can result in undesirable effects such as wear, heat generation and brake noise. Methods of reducing such instabilities are known. For example, a shim may be provided behind the brake pad relative to the surface facing the brake disc, which is designed to dampen the instabilities. Nevertheless, brake squeal still remains to be a problem.

DE4140220 describes a brake pad having a coefficient of friction that varies across the brake pad. The area of the brake pad proximal to a rotation axis of a brake disc has a high coefficient of friction. Accordingly DE4140220 aims to provide a brake pad that, on contact with the brake disc, heats up evenly across its surface and therefore decreases turbulence. However, the brake pad of DE4140220 still suffers from instabilities that cause brake squeal. Furthermore, the brake pad of DE4140220 may lead to a loss in braking power when compared to a brake pad having a constant coefficient of friction across the surface.

JP2005-299841 describes a brake pad that aims to reduce brake squeal by providing a brake pad comprising two materials, one having a high coefficient of friction and the other having a low coefficient of friction. The material having the low coefficient of friction is positioned proximal to a rotation axis of a brake disc. A calliper supplies a force to press the region of high coefficient of friction onto the brake disc. The region of high coefficient material is formed radially thin, i.e. having a small area, in comparison to the region of low coefficient material, which is radially thick and therefore has a large area. JP2005-299841 purports that brake squeal is reduced by this configuration. However, in the event that the relatively large area of low coefficient material contributes to the stopping ability of the brake pad, the large area of low coefficient material is susceptible to produce brake squeal. Therefore, the brake pad of JP2005-299841 either suffers from brake squeal or reduced stopping ability, both of which are undesirable.

It is therefore an object of the present invention to ameliorate the aforementioned problems.

SUMMARY OF THE INVENTION

According to an embodiment of the present invention there is provided a brake pad for a brake system, the brake pad comprising:

a first brake pad surface having a coefficient of friction, for contact, in use, with a first radial portion of a component having a rotation axis, wherein:

at a first point on the first brake pad surface the coefficient of friction has a first value;

at a second point on the first brake pad surface the coefficient of friction has a second value greater than the first value; and at a third point on the first brake pad surface the coefficient of friction has a third value greater than the second value, wherein, in use, the first, second and third points are configured to be contactable with corresponding points on the first radial portion of the component at locations of increasing radial distance from the rotation axis so that the second point is further from the rotation axis than the first point, and the third point is further from the rotation axis than the second point.

The variation of the coefficient of friction across the surface has the advantage of reducing the degree of instabilities caused when the brake pad contacts the component. Some of the instabilities are associated with brake squeal, which is therefore reduced.

Preferably, a first spacing between the first and second points is substantially equal to a second spacing between the second and third points.

In a preferred embodiment, the first point is positioned at a first edge of the first brake pad surface being relatively proximal to the rotation axis, and the third point is positioned at a third edge of the first brake pad surface being relatively distal to the rotation axis.

Optionally, the coefficient of friction at each of the first, second and third points are related by a linear relationship. This has the advantage of substantially matching the coefficient of friction at a radial position with a function of the tangential velocity of the component at that radial position. Accordingly, the coefficient of friction is higher at regions of higher tangential velocity relative to regions where the coefficient of friction is lower at regions corresponding to lower tangential velocity. Providing a relationship between the coefficient of friction and the tangential velocity serves to significantly reduce instabilities that cause brake squeal to a sufficient level whilst maintaining adequate, safe, stopping ability of the brake pad.

In a preferred embodiment, a force presses the first brake pad surface onto the radial portion of the component. In use, the force may act adjacent to the third point. This has the advantage that the force acts directly over the region of highest coefficient of friction, thus providing a high braking power relative to if the force were applied directly over a region of low coefficient of friction.

In another preferred embodiment the brake pad further comprises a second brake pad surface having a coefficient of friction, for contact, in use, with a second radial portion of the component, wherein:

at a fourth point on the second brake pad surface the coefficient of friction has a fourth value less than the third value; and at a fifth point on the second brake pad surface the coefficient of friction has a fifth value less than the fourth value, wherein, in use, the fourth and fifth points are configured to be contactable with corresponding points on the second radial portion of the component at locations of increasing radial distance from the rotation axis so that the fifth point is further from the rotation axis than the fourth point. Preferably, the coefficient of friction at each of the third, fourth and fifth points are related by a linear relationship.

This embodiment provides additional braking power to the brake pad comprising the first surface only, without significantly increasing instabilities associated with brake noise.

In a preferred embodiment, the first brake pad surface is a substantially arcuate planar shape. Preferably, the planar surface comprises at least three layers being layered in a radial direction, wherein each layer has a surface that forms part of the planar surface, the surface of each layer having a coefficient of friction whereby the first point is positionable on the surface of a first one of the layers, the second point is positionable on the surface of a second one of the layers, and the third point is positionable of a third one of the layers. Furthermore, the planar surface may comprise more than three layers, each of the more than three layers being layered adjacent to or between the first, second and third ones of the at least three layers. Optionally, the coefficient of friction of each layer is configured to be greater than the coefficient of friction of an adjacent layer where, in use, the adjacent layer is radially closer to the rotation axis. Preferably, each layer may have a material composition that provides the coefficient of friction. Alternatively, the surface of each layer may comprise a surface treatment to provide the varying coefficient of friction.

In a preferred embodiment each layer has a substantially arcuate shape. Preferably, the radius of the arcuate shape of each layer is substantially equal, in use, to the radial distance of the layer from the rotational axis. Preferably, the thickness of each layer in the radial direction is substantially similar. Arcuate layers provide the advantage of matching the coefficient of friction to a function of the tangential velocity of the brake disc over the entire region of the layer. Accordingly, brake squeal is reduced by this embodiment.

In a further preferred embodiment the coefficients of friction of adjacent points have a difference in coefficient of friction between 0.05 and 0.2. Preferably the difference in coefficient of friction is between 0.08 and 0.12.

According to a further aspect of the present invention, there is provided a method of forming a brake pad for a brake system, the brake pad comprising a first brake pad surface for contact, in use, with a first radial portion of a component having a rotation axis, the method comprising:
  providing a first material having a first coefficient of friction, and positioning the first material to provide a first value of coefficient of friction at a first point on the brake pad surface;
  providing a second material having a second coefficient of friction, and positioning the second material to provide a second value of coefficient of friction at a second point on the brake pad surface; and,
providing a third material having a third coefficient of friction, and positioning the third material to provide a third value of coefficient of friction at a third point on the brake pad surface;
wherein, in use, the first, second and third points are configured to be contactable with corresponding points on the first radial portion of the component at locations of increasing radial distance from the rotation axis so that the second point is further from the rotation axis than the first point, and the third point is further from the rotation axis than the second point.

Preferably, the second material is formed by a combination of the first and third materials. The brake pad may be formed by blending the first and third materials between the first and third points. Preferably, the blending of the materials between the first and third points is linear. This has the advantage that a smooth gradient of coefficient of material between the first and third points is produced.

In a preferred embodiment, the first, second and third materials are provided as layers being layered in a radial direction.

According to another aspect of the present invention there is provided a brake system comprising a brake disc and a brake pad for braking contact with the brake disc, the brake pad being as hereinbefore described.

According to another aspect of the present invention there is provided a vehicle with a brake system as hereinbefore described.

According to another aspect of the present invention there is provided a vehicle with a brake pad as hereinbefore described.

A further aspect of the invention is defined as providing a brake pad for a brake system, the brake pad comprising a brake pad surface for contact, in use, with a contact surface of a component to which a braking force is to be applied, said contact causing braking of said component, the coefficient of friction of the brake pad surface being non-uniform across the surface.

Another further aspect of the present invention is defined as, there is provided a brake pad for a brake system, the brake pad comprising a brake pad surface for contact, in use, with a contact surface of a component to which a braking force is to be applied, said contact causing braking of the component, the coefficient of friction of the brake pad surface being non-uniform across the surface, such that brake squeal is reduced in comparison to a conventional brake pad with a substantially uniform coefficient of friction across the surface.

BRIEF DESCRIPTION OF THE DRAWINGS

Embodiments of the invention will now be described, by way of example only, with reference to the accompanying drawings, in which.

DETAILED DESCRIPTION

Detailed descriptions of specific embodiments of the brake pad, brake system, vehicle and method of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the brake pad, brake system, vehicle and method described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
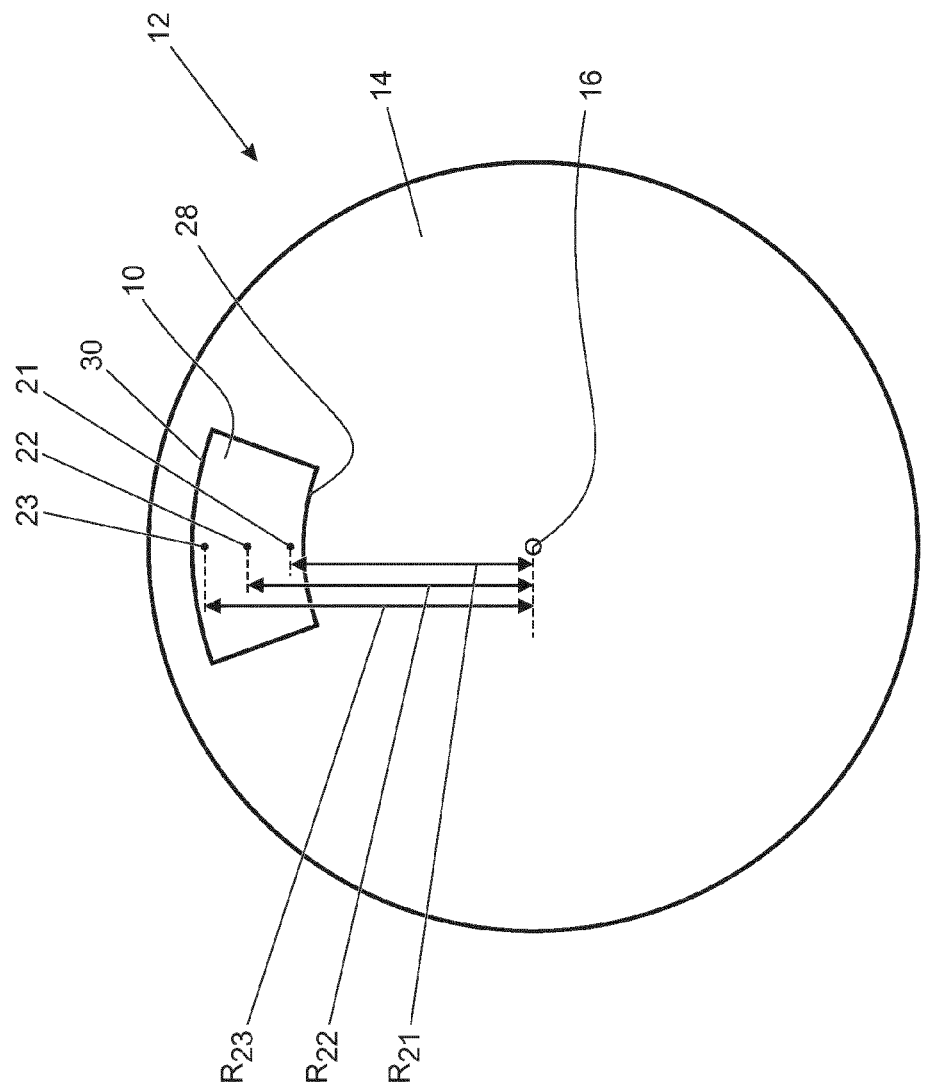
FIG. 1 is a schematic illustration of a brake pad and brake system according to an embodiment of the invention.

FIG. 1 shows a brake pad 10 for a brake system 12 for braking the motion of a vehicle (not shown). The brake system comprises a disc brake, or other component, that has a rotational axis 16. In use, the brake disc 14 rotates about the rotational axis 16 as the vehicle moves. The brake pad is fixed relative to the rotational motion of the brake disc inside a brake calliper (not shown) and is moveable in a direction substantially perpendicular to the rotation of the disc so as to be removably contactable with the brake disc 14. A force applied by the calliper to the brake pad causes a surface of the brake pad 10 to contact a surface of the brake disc 14. Frictional forces acting between the contacting surfaces of the brake pad and the brake disc decrease the rotational velocity of the brake disc. The brake pad and brake disc surfaces each have a coefficient of friction. Conventionally, the coefficient of friction is uniform across the surface of the brake pad.

As mentioned, the brake pad is substantially fixed relative to the rotational motion of the brake disc. The radial position of the brake pad is also substantially fixed relative to the rotational axis 16. This may be such that the brake pad is positioned near the perimeter of the brake disc or near to the rotation axis 16. Thus, in use, features of the embodiments of the current invention have a substantially fixed relationship to the rotational axis 16 and therefore, the following description describes the features of the embodiments of the current invention with reference to the rotational axis 16 of the brake disc 14. It should be understood therefore that the features of the embodiments of the current invention are arranged such that when used, the embodiments of the current invention provide the aforementioned advantages.

According to an embodiment of the present invention, the coefficient of friction is varied across the surface of the brake pad 10. FIG. 1 schematically shows three points: a first point 21; a second point 22; and a third point 23, positioned on the surface. The skilled reader will appreciate that the points 21, 22, 23 as shown in FIG. 1 would not normally be visible when viewing the brake system 12 in this configuration because the surface on which the points 21, 22, 23 are positioned faces the surface of the brake disc 14 and is, therefore, not visible. However, the illustration of these points in FIG. 1 provides suitable reference for this description.

The first point 21 corresponds to a position on the brake pad surface that has a first value of coefficient of friction. Likewise, the second point 22 and third point 23 have second and third values of coefficient of friction, respectively. The first, second and third points 21, 22, 23 are positioned at locations of increasing radial distance from the rotation axis 16. Specifically: the first point 21 is located at a radial distance $R_{21}$ from the rotation axis 16; the second point 22 is located at a radial distance $R_{22}$ from the rotation axis 16; and, the third point 23 is located at a radial distance $R_{23}$ from the rotation axis 16. Therefore, the coefficient of friction of the brake pad surface increases with increasing radial distance from the rotation axis 16.

In an embodiment of the invention, the value of coefficient of friction at each point may be related by a linear relationship, wherein:

$$\text{Second Value} = [\text{First Value}] + k \times (R_{22} - R_{21})$$

$$\text{Third Value} = [\text{Second Value}] + k \times (R_{23} - R_{22})$$

Where k is a constant and $(R_{23}-R_{22})=(R_{22}-R_{21})$. Using such a linear relationship can also provide for the coefficient of friction across the surface to be directly proportional to the radial distance from the rotation axis. Accordingly, the coefficient of friction corresponds to the tangential velocity of underlying points on the brake disc 14 when the brake disc 14 is rotating. In alternative embodiments, k may not be constant such that when $(R_{23}-R_{22})=(R_{22}-R_{21})$, the relationship of the first second and third values is not linear.

Figure 2:
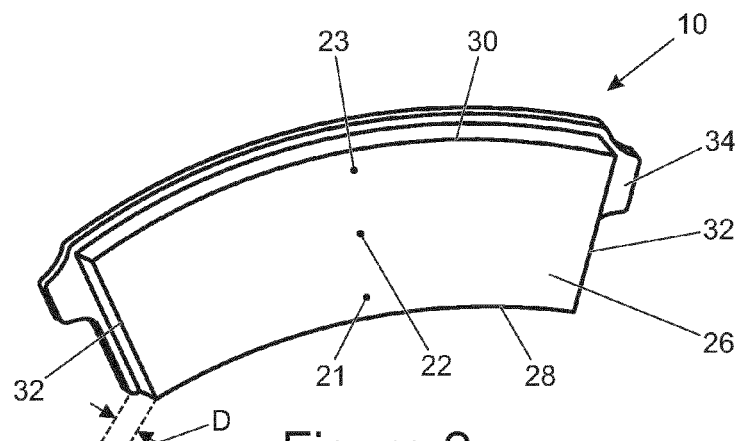
FIG. 2 is a perspective view of a brake pad according to an embodiment of the invention.

FIG. 2 shows the brake pad 10 according to an embodiment of the present invention. The surface of the brake pad, or first brake pad surface 26, as described above, is shown and the first, second and third points 21, 22, 23, are indicated. The brake pad has a depth D and the first brake pad surface 26 is substantially planar. A first edge 28 of the surface 26 is proximal to the rotation axis 16 in use (see FIG. 1) relative to a third edge 30 that is distal to the rotation axis 16 in use (see FIG. 1). Second edges 32 are at ends of the surface 26 and extend substantially radially with respect to the rotation axis. Therefore, the brake pad is preferably an arcuate sector of a circle and the brake pad is arranged such that, in use, the arcs of the first and third edges are arcs of circles with the rotation axis 16 at their centre. It should however, be understood that other shapes of brake pad are within the scope of this invention. For example, the outer shape of the surface may be square, circular, complex, etc. Conventionally, brake pads also comprise a mount/backplate 34 for mounting the brake pad within the caliper. This element does not, however, limit the scope of the invention as other mounting methods are known and therefore within the scope of this invention.

Figure 3:
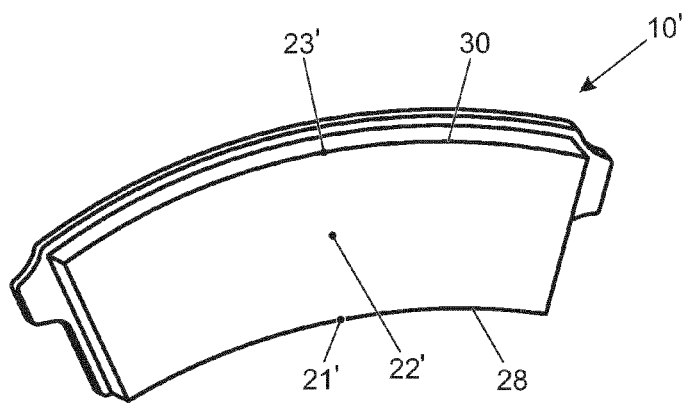
FIG. 3 is a perspective view of a brake pad according to an embodiment of the invention.

FIG. 3 shows a brake pad 10' according to an embodiment of the present invention. The brake pad 10' comprises the features of the brake pad 10. However, in this embodiment, the first, second and third points 21', 22', 23' are positioned such that the first point 21' is on the first edge 28 and the third point 23' is on the third edge 30.

Figure 4:
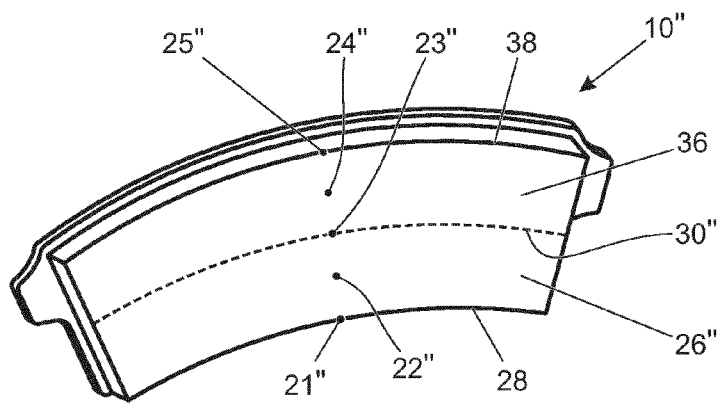
FIG. 4 is a perspective view of a brake pad according to an embodiment of the invention.

FIG. 4 shows a brake pad 10" according to an embodiment of the present invention. The brake pad 10" comprises the features of the brake pad 10, and further comprises a second brake pad surface 36 which comprises a fourth point 24" and a fifth point 25". In a preferred embodiment, the fourth value of coefficient of friction at the fourth point is less than the third value of coefficient of friction at the third point 23". In turn, the fifth value of coefficient of friction at the fifth point 25" is less than the fourth value of coefficient of friction at the fourth point 24". The third point 23" is shown on the third edge 30" of the surface 26" and the first point 21" is shown on the first edge 28. The fifth point 25" is on a fifth edge 38 of the second surface 36. These points may also be positioned inside the edges as per the embodiment of FIG. 2. Furthermore, in practice, there may not be an edge at 30" where instead, this is theoretical line. Alternatively, the surface 26" and second surface 36 can be separated by a gap so that the surface 26" comprises a third edge and the second surface 36 comprises a third edge.

Figure 5:
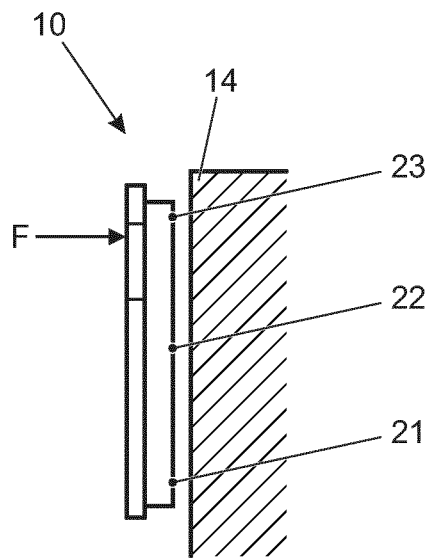
FIG. 5 is a cross-section of a brake pad and brake system according to an embodiment of the invention.

FIG. 5 shows a side view cross-section of the brake pad 10 according to any of the embodiments described herein. As mentioned, in use a force presses the brake pad 10 onto the brake disc 14. The force is indicated by the arrow F in FIG. 5. In the embodiment of the invention shown in FIG. 5, the force F acts adjacent to the point 23. This has the advantage that the force acts over the region with the highest coefficient of friction. For the embodiment of FIG. 4, in the example where the force is adjacent to the third point 23", the force will be applied in the centre of the brake pad. Alternatively, it is within the scope of the invention that the force is applied evenly over the surface of the brake pad 10, or is concentrated in another location on the pad.

Figure 6:
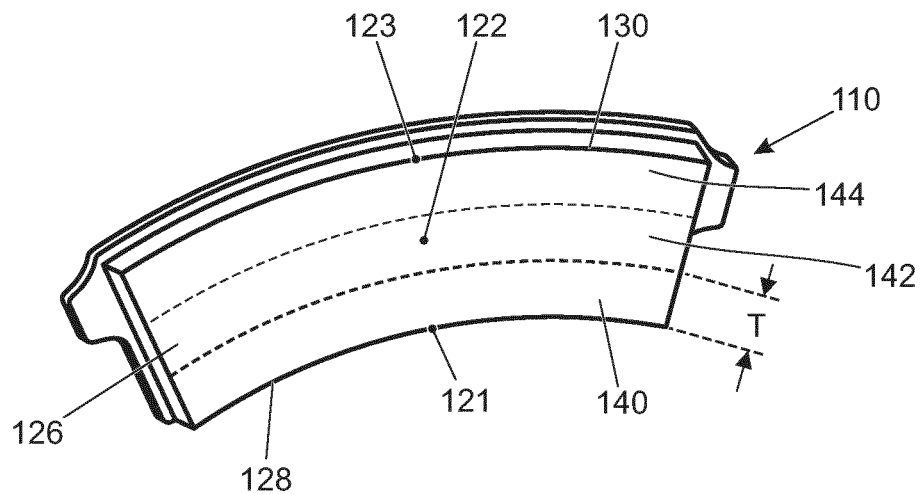
FIG. 6 is a perspective view of a brake pad according to an embodiment of the invention.

FIG. 6 shows another embodiment according to the present invention where like features to the embodiments depicted in FIGS. 1 to 5 are referenced by like numerals prefixed with a 1 so that, for example, the brake pad 10 of FIGS. 1 to 5 corresponds to the brake pad 110 in FIG. 6. Therefore, it should be noted that the embodiment of FIG. 6 provides an example according to the present invention that has the features of the coefficient of friction arrangement as described in relation to FIGS. 1 to 5 with additional features described below.

FIG. 6 shows the brake pad 110 comprising three layers of material forming the brake pad surface 126. A first layer 140 comprises a coefficient of friction corresponding to the value of the coefficient of friction at the first point 121. Likewise a second and third layer 142, 144 comprises a coefficient of friction corresponding to the value of the coefficient of friction at the second and third points 122, 123 respectively. The varying coefficient of friction of the layers 140, 142, 144 may be provided, for example, by the material properties of the layers or may be provided by a surface treatment of the layers.

The layers are preferably of equal thickness T. More than three layers may also be provided. For example, there may be four, five or more layers. Each layer preferably has an arcuate shape having a radius substantially equal to the radial displacement of the layer from the rotation axis 16. For the scenario comprising five layers, the brake pad surface 26 has values of coefficient of friction increasing with each layer in the direction which, in use, would relate to the radial direction of the disc 14 (and also the wheel of a vehicle), from the inside to the outside of the brake disc. By reference to the rotation axis, the innermost layer has a coefficient of friction of 0.3 and the outermost layer has a coefficient of friction of 0.7, so that each layer has a coefficient of friction varying by 0.1 from its adjacent layer. This arrangement reduces instabilities associated with brake noise/squeal.

The varying coefficient of friction may also be achieved by a process such as additive manufacturing whereby, for example, a first material having a low coefficient of friction and a second material having a high coefficient of friction are blended such that at the first edge 28, 128, the brake pad 10, 110 substantially only comprises the first material and at the third edge 30, 130, the brake pad 10, 110 substantially only comprises the second material, and between the first and the third edge, the brake pad 10, 110 comprises a blend of the first and the second material. For a linear relationship of the coefficient of friction at the first, second and third points 121, 122, 123, the blend of the first and second materials is linear between the first and third edges 128, 130. Other blend patterns are within the scope of the invention.

The skilled person would appreciate that the important feature in the above embodiments is that, at least over a portion of the surface of the brake pad, but preferably over the whole of the surface of the brake pad, the coefficient of friction increases progressively across the surface of the brake pad (whether by means of layers or blending of materials, or by other suitable means such as variations in surface treatments), in a direction, in use that would relate to the radial direction of the disc 14 (and also the wheel of a vehicle), from the inside to the outside of the brake disc. As discussed, the progressive increase is preferably achieved in a linear fashion, but other forms of increase may be suitable.

In the embodiment of FIG. 4, the method of varying the coefficient of friction by blending materials in an additive manufacturing process would comprise providing the first material having a low coefficient of friction at the first point 21" and the fifth point 25", and providing the second material having a high coefficient of friction at the third point 23". A linear varying coefficient of friction between the first 21" and third 23" points and the third 23" and fifth points 25" is provided using a blend of the first and second materials so that, for example, the brake pad composition at point 22" and 24" is provided by equal ratios of the first and second material.

The brake pad 10, 110 of any of the foregoing embodiments may also comprise grooves, or slits, extending substantially radially across the brake pad surface 26 to release the build-up of brake gases and/or heat where the brake pad contacts the brake disc.

Figure 7:
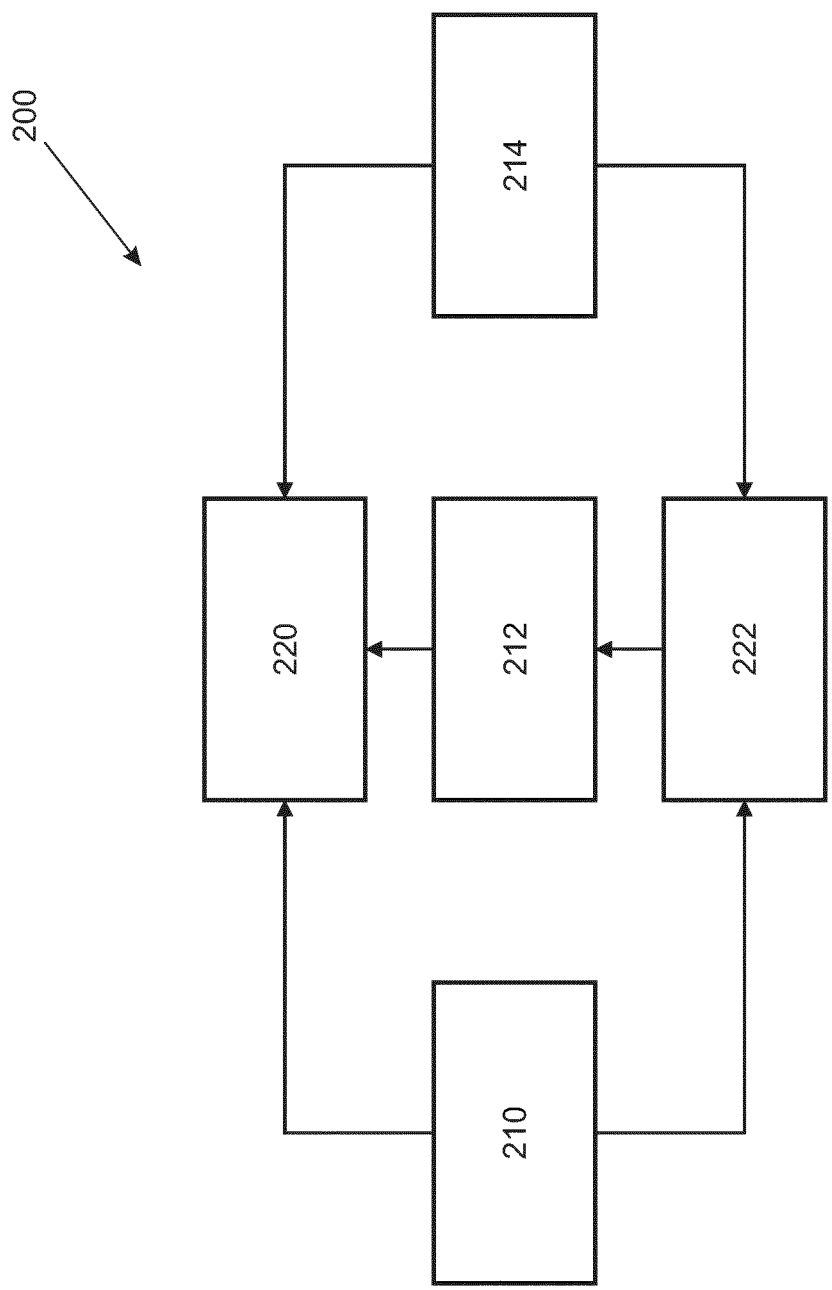
FIG. 7 is a flow chart of a method according to an embodiment of the invention.

According to another embodiment of the present invention there is a method 200, as shown in FIG. 7, of forming a brake pad, as hereinbefore described, for a brake system, the brake pad comprising a first brake pad surface for contact, in use, with a first radial portion of a component having a rotation axis, the method comprising:

providing a first material 210 having a first coefficient of friction, and positioning the first material to provide a first value of coefficient of friction at a first point on the brake pad surface;

providing a second material 212 having a second coefficient of friction, and positioning the second material to provide a second value of coefficient of friction at a second point on the brake pad surface; and, providing a third material 214 having a third coefficient of friction, and positioning the third material to provide a third value of coefficient of friction at a third point on the brake pad surface; and combining 220 the first, second and third materials to form the first brake pad surface, wherein, in use, the first, second and third points are configured to be contactable with corresponding points on the first radial portion of the component at locations of increasing radial distance from the rotation axis so that the second point is further from the rotation axis than the first point, and the third point is further from the rotation axis than the second point.

In a preferred embodiment of the method 200, the second material is formed by a combination 222 of the first and third materials. Preferably the brake pad is formed by blending the first and third materials between the first and third points. The blending of the materials between the first and third points may be linear. Alternatively, the first, second and third materials are provided as layers being layered in a radial direction. Following combination of the first, second and third materials, a brake pad mount may be provided to the materials. Alternatively, the materials may be disposed on the mount.

In formation of a brake pad according to FIG. 4, a fourth and fifth material are also provided. These materials can optionally be the same materials as the second and first materials respectively.

In another method of forming the brake pad, a variable coefficient material may be manufactured as a blank (using any of the foregoing methods of forming the brake pad) and then the brake pad shape may be cut from the material blank.

The invention claimed is:

1. A brake pad for a brake system, the brake pad comprising:
a first, substantially planar, brake pad surface having a coefficient of friction, the first substantially planar brake pad surface being removably contactable, in use, with a first radial portion of a brake disc having a rotation axis, wherein:
at a first point on the first brake pad surface the coefficient of friction has a first value;
at a second point on the first brake pad surface the coefficient of friction has a second value greater than the first value; and
at a third point on the first brake pad surface the coefficient of friction has a third value greater than the second value,
wherein, in use, the first, second and third points are configured to be contactable with corresponding points on the first radial portion of the component at locations of increasing radial distance from the rotation axis so that the second point is further from the rotation axis than the first point, and the third point is further from the rotation axis than the second point,
wherein the first point is positioned at a first edge of the first brake pad surface being relatively proximal, in use, to the rotation axis, and the third point is positioned at a third edge of the first brake pad surface being relatively distal, in use to the rotation axis; and
wherein the first substantially planar brake pad surface substantially occupies an area between a first terminal edge of the brake pad, proximal to the rotation axis in use, and a second terminal edge of the brake pad, distal to the rotation axis in use.

2. A brake pad as claimed in claim 1, wherein the coefficients of friction at each of the first, second and third points are related by a linear relationship.

3. A brake pad as claimed in claim 1, wherein, in use, a force presses the first brake pad surface onto the radial portion of the component.

4. A brake pad as claimed in claim 3, wherein, in use, the force acts adjacent to the third point.

5. A brake pad as claimed in claim 1, wherein the first brake pad surface is a substantially arcuate planar shape.

6. A brake pad as claimed in claim 1, wherein the first brake pad surface comprises at least three layers being layered in a radial direction, wherein each layer has a surface that forms part of the first brake pad surface, each layer surface having a coefficient of friction wherein the first point is on the surface of a first one of the layers, the second point is on the surface of a second one of the layers, and the third point is on a third one of the layers.

7. A brake pad as claimed in claim 6, wherein the first brake pad surface comprises the first, second and third ones of the at least three layers and at least one additional layer of the at least three layers, each of the additional layers being layered adjacent to or between the first, second and third ones of the at least three layers.

8. A brake pad as claimed in claim 7, wherein the coefficient of friction of each of the at least three layers of the first brake pad surface is configured to be greater than the coefficient of friction of an adjacent layer where, in use, the adjacent layer is radially closer to the rotation axis.

9. A brake pad as claimed in claim 6, wherein each layer has a material composition that each provide the different coefficients of friction at the first, second and third points.

10. A brake pad as claimed in claim 6, wherein the surface of each layer comprises a surface treatment.

11. A brake pad as claimed in claim 6, wherein each layer has a substantially arcuate shape.

12. A brake pad as claimed in claim 11, wherein, in use, to the rotation axis, and wherein, in use, arcs of the first and third edges are arcs of circles with the rotation axis at their center.

13. A brake pad as claimed in claim 6, wherein the thickness of each layer surface in the radial direction is substantially similar.

14. A brake pad as claimed in claim 1, wherein the coefficient of friction of adjacent points have a difference in coefficient of friction between 0.05 and 0.2.

15. A brake pad as claimed in claim 14, wherein the difference in coefficient of friction is between 0.08 and 0.12.

16. A brake pad as claimed in claim 1, wherein the substantially planar first brake pad surface is configured to contact the radial component with the first, second, and third points simultaneously.

17. A method of forming a brake pad for a brake system, the brake pad comprising a first, substantially planar, brake pad, the method comprising:
providing a first portion of the substantially planar brake pad surface having a first coefficient of friction at a first point on the brake pad surface, wherein the substantially planar brake pad surface is removably contactable, in use, with radial portion of a brake disc having a rotation axis;
providing a second portion of the substantially planar brake pad surface having a second coefficient of friction at a second point on the brake pad surface; and,
providing a third portion of the substantially planar brake pad surface having a third coefficient of friction at a third point on the brake pad surface;
wherein, in use, the first, second and third points are configured to be contactable with corresponding points on the first radial portion of the component at locations of increasing radial distance from the rotation axis so that the second point is further from the rotation axis than the first point, and the third point is further from the rotation axis than the second point;
wherein the first point is positioned at a first edge of the first brake pad surface being relatively proximal, in use, to the rotation axis, and the third point is positioned at a third edge of the first brake pad surface being relatively distal, in use, to the rotation axis; and
wherein the first substantially planar brake pad surface substantially occupies an area between a first terminal edge of the brake pad, proximal to the rotation axis in use, and a second terminal edge of the brake pad, distal to the rotation axis in use.

18. A method as claimed in claim 17, wherein the first, second and third portions of the brake pad surface are provided using first, second and third materials.

19. A method as claimed in claim 18, wherein the second material is formed by a combination of the first and third materials.

20. A method as claimed in claim 19, wherein the brake pad is formed by blending the first and third materials between the first and third points.

21. A method as claimed in claim 20, wherein the blending of the materials between the first and third points is such that it results in each of the first, second and third points having coefficients of friction that are related by a linear relationship.

22. A method of forming a brake pad as claimed in claim 18, wherein the first, second and third materials are provided as layers being layered in a radial direction.

23. A brake system for a vehicle, the brake system comprising:
   a brake disc having a rotation axis; and
   a brake pad for braking contact with the brake disc, the brake pad comprising:
      a first, substantially planar, brake pad surface having a coefficient of friction, the first substantially planar brake pad surface being removably contactable, in use, with a first radial portion of the brake disc to decrease or prevent motion of a vehicle, wherein:
         at a first point on the first brake pad surface the coefficient of friction has a first value;
         at a second point on the first brake pad surface the coefficient of friction has a second value greater than the first value; and
         at a third point on the first brake pad surface the coefficient of friction has a third value greater than the second value,
      wherein, in use, the first, second and third points are configured to be contactable with corresponding points on the first radial portion of the brake disc at locations of increasing radial distance from the rotation axis so that the second point is further from the rotation axis than the first point, and the third point is further from the rotation axis than the second point,
      wherein the first point is positioned at a first edge of the first brake pad surface being relatively proximal, in use, to the rotation axis, and the third point is positioned at a third edge of the first brake pad surface being relatively distal, in use, to the rotation axis; and
      wherein the first substantially planar brake pad surface substantially occupies an area between a first terminal edge of the brake pad, proximal to the rotation axis in use, and a second terminal edge of the brake pad, distal to the rotation axis in use.

24. A vehicle comprising a brake system according to claim 23.

* * * * *